United States Patent [19]

Kulkarni

[11] Patent Number: 5,068,162

[45] Date of Patent: Nov. 26, 1991

[54] RESERVE ACTIVATED ELECTROCHEMICAL CELL

[75] Inventor: Milind V. Kulkarni, Melrose Park, Pa.

[73] Assignee: Honeywell Inc., Minneapolis, Minn.

[21] Appl. No.: 339,444

[22] Filed: Apr. 17, 1989

[51] Int. Cl.$^5$ .............................................. H01M 6/30
[52] U.S. Cl. ....................................... 429/116; 429/110
[58] Field of Search ............................ 429/116, 110, 52

[56] References Cited

U.S. PATENT DOCUMENTS

| | | | |
|---|---|---|---|
| 3,619,298 | 11/1971 | Jammet | 429/116 |
| 3,629,009 | 12/1971 | Bennett | 429/116 X |
| 3,869,315 | 3/1975 | Dolgner | 429/116 |
| 4,588,662 | 5/1986 | McManis | 429/116 X |

*Primary Examiner*—Anthony Skapars
*Attorney, Agent, or Firm*—Mitchell J. Halista

[57] ABSTRACT

A reserve activated electrochemical cell in a battery embodiment uses a tubular electrolyte storage compartment arranged in a concentric spiral having similar diameter turns thereof located on a common axis. The tubular spiral is assembled concentrically with a battery plate stack container in a volumetrically efficient package with a first end of the spiral having an outwardly projecting flange located adjacent to one wall of the stack container. An intermediate annular spacer is located between the flange and the wall of the stack container to provide a fluid-tight seal therebetween, to define a fluid channel therethrough and to separate different materials forming the stack container and the electrolyte storage spiral. A first rupturable diaphragm is attached with a fluid-tight seal across the inner diameter of the first end of the tubular spiral facing the battery stack to maintain hermeticity therein. A second rupturable diaphragm is attached with a fluid-tight seal across an opening in the wall of the stack container facing the first diaphragm. The flange at the first end of the spiral and the spacer are attached to the wall of the battery stack container by any suitable means to form a layered structure therewith concentric with the spacer and the first and second diaphragms. The other or second end of the spiral is connected to a pressure generator using a pyrotechnic charge activated by an electrical signal for selectively providing a gas pressure directed against an electrolyte in the storage compartment. Electrical connections to the battery plates within the stack container are provided by corresponding electrically conductive leads extending from the battery stack container through respective fluid-tight seals.

10 Claims, 2 Drawing Sheets

RESERVE ACTIVATED ELECTROCHEMICAL CELL

BACKGROUND OF THE INVENTION

1. Field of the Invention

The present invention relates to electric current producing electrochemical cells. More specifically, the present invention is directed to a reserve activated electrochemical cell containing a cell fluid container for selectively releasing a stored reactive fluid to activate the electrochemical cell.

2. Description of the Prior Art

Reserve activated electrochemical cell in the form of deferred action type batteries in which the battery electrolyte is stored in an electrolyte compartment and is maintained out of contact with the plates of the battery located in a battery plate compartment during a storage time of the battery and which can be selectively brought into contact with the battery plates to initiate an operation of the battery are well-known in the art, e.g., U.S. Pat. Nos. 2,404,144; 3,005,863; 3,067,274; 3,743,545 and 4,762,757. Such reserve batteries commonly comprise a cell stack of battery plates in which the plates are separated from an electrolyte by a frangible or rupturable disc or diaphragm located between the electrolyte compartment and the battery plate compartment. To initiate operation of the battery, the separator is pierced in some manner, and the electrolyte is subsequently introduced into the cell stack. Thus, such deferred action batteries are used when it is necessary to have a battery with a long shelf life or when activation of the battery is desired only immediately prior to use. Such deferred action batteries have been used extensively in military devices which depend on electrical chemical battery power for operation, but wherein safety and reliability of the battery require that the battery is not activated until it is actually needed for operation of the equipment. In the examples shown in the aforesaid references, various means are provided for introducing the electrolyte into the cell stack, e.g., a mechanically actuated lance can be used to pierce the diaphragm, an explosive squib can be fired electrically by an electrical current produced by externally applied voltage to produce an explosive derived force such as a pressurized gas, etc. These prior art reserve or deferred action type batteries suffer from a common inherent limitation which is effective to preclude their use in certain applications. This limitation is based on the fact that they are not amenable to extreme environments inasmuch as they use an integral electrolyte storage compartment usually of a flexible material which is easily rupturable, do not provide a capability of utilizing differing stress resistant materials for separate compartments which can minimize the weight of the cell and do not maximize interchangeability between the electrolyte storage compartment and the battery stack to limit shelf life to the plate container which can significantly enhance storage longevity. Accordingly, it would be desirable to provide a reserve battery which afforded a stress resistant storage compartment for the electrolyte separable and distinct from the container for the battery plate stack in a cell structure to maximize compatibility therebetween.

SUMMARY OF THE INVENTION

An object of the present invention is provide an improved reserve activated electrochemical cell.

Another object of the present invention is to provide an improved cell fluid storage compartment for use with a reserve activated electrochemical cell.

In accomplishing these and other objects, there has been provided, in accordance with the present invention, a reserve activated electrochemical cell including a cell reactive fluid storage means in the form of a tubular spiral, a cell plate container means, a rupturable means for providing a fluid-tight separation of the fluid storage means from the cell plate container means and an intermediate spacer means for selectively attaching said fluid storage means to said cell plate container means while providing a fluid channel including said rupturable means.

BRIEF DESCRIPTION OF THE DRAWINGS

A better understanding of the present invention may be had when the following description is read in connection with the accompanying drawings.

DESCRIPTION OF THE PREFERRED EMBODIMENT

Figure 1:
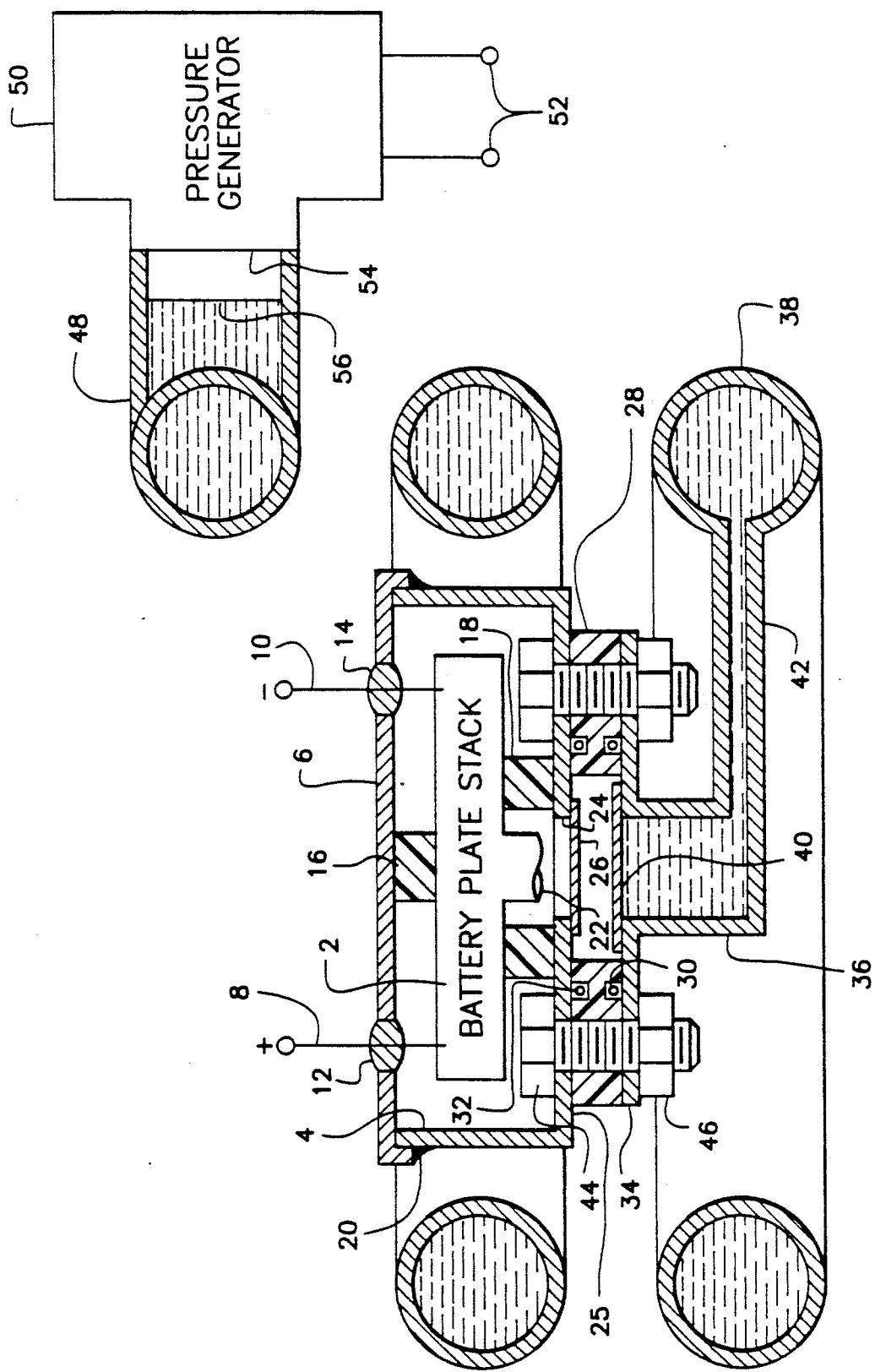
FIG. 1 is a cross-sectional illustration of a reserve activated electrochemical cell embodying the present invention in an inactive cell fluid storing state taken along cross-sectional lines 1—1 as shown in FIGS. 2 and 3.
Figure 2:
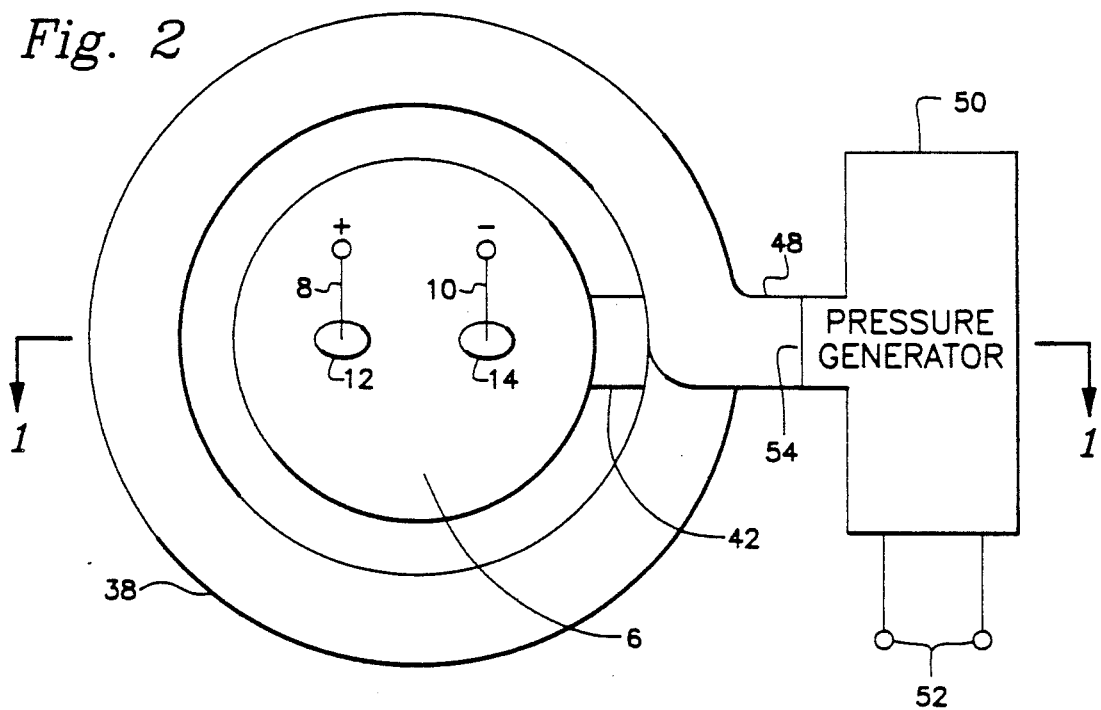
FIG. 2 is a top view of the electrochemical cell shown in FIG. 1.
Figure 3:
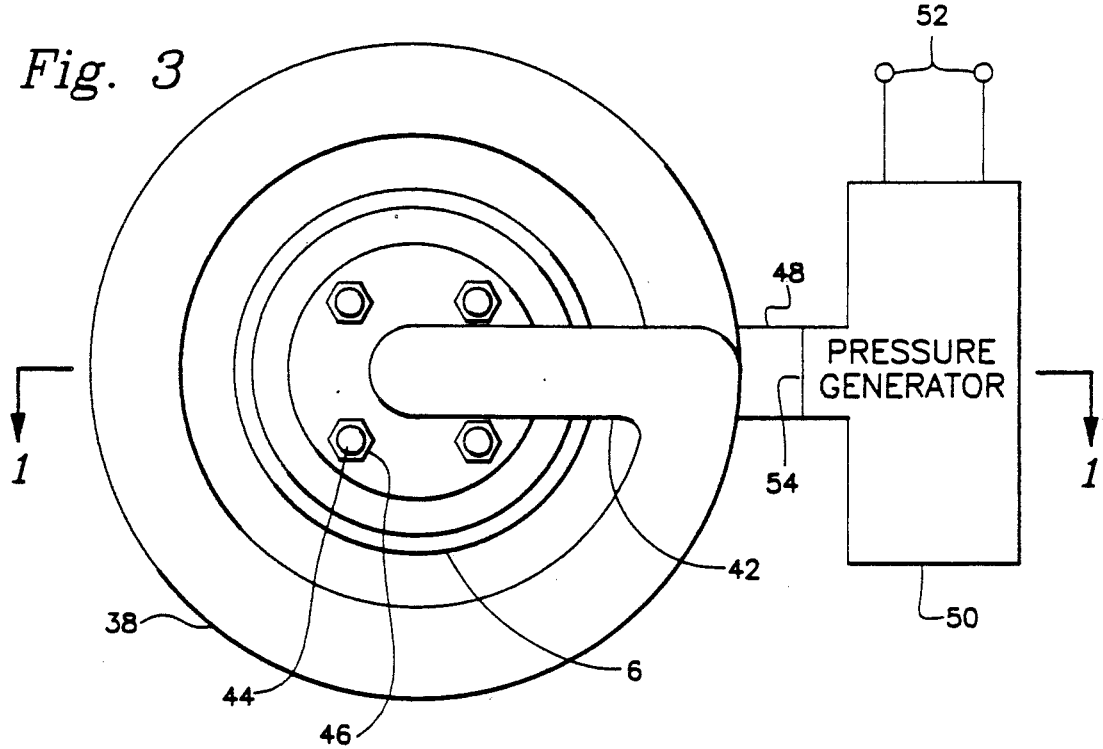
FIG. 3 is a bottom view of the electrochemical cell shown in FIG. 1.

Referring to FIGS. 1, 2 and 3 in more detail, there is shown a deferred action electrochemical cell in an inactive state and having a battery plate stack 2, i.e., a layered assembly of anode and cathode plates, located within a cup-shaped battery plate container 4. An open end of the battery plate container 4 is closed by a cover 6. A pair of external battery leads 8 and 10 are connected to corresponding positive and negative terminals of the battery plate stack 2 and extend through respective openings in the cover 6. The battery leads 8,10 are electrically insulated from the cover 6 by electrically insulating seals 12,14, respectively. The battery plate stack 2 is located within the housing 4 by a pair of resilient electrically insulating internal spacers 16,18 layered on respective sides of the battery stack 2 which are compressed during an assembly of the cell and serve to position the battery plate stack 2 to inhibit movement of the battery plate stack 2 within the container 4. A weld bead 20 is used to peripherally attach the cover 6 to the container 4 and to provide a fluid-tight seal therewith.

The battery plate stack 2 is provided with a central opening 22 which is axially aligned with a hole 24 in an adjacent bottom wall 25 of the container 4. The lower resilient spacer 18 abutting the wall 25 is ring-shaped and is coaxial with the opening 22 and the hole 24 to define a fluid channel therebetween. Thus, the spacer 18 is compressed between the battery stack 2 and the adjacent wall 25 of the container 4 surrounding the hole 24 to provide a fluid seal with the stack 2 and the container 4. A frangible or rupturable, thin metal diaphragm is attached across the opening 24 by any suitable means to provide a fluid-tight seal with the adjacent wall 25 of the container 4 to maintain the hermeticity of the container 4.

An external interface spacer 28 in the form of an annular ring is arranged to surround the opening 24 on the other side of wall 25 of the container 4 from the spacer 18. A pair of O-rings 30,32 are provided in respective grooves in opposite faces of the spacer 28. The first O-ring 32 provides a fluid-tight seal between the spacer 28 and an outside surface of the wall 25 of the container 4. The second O-ring 30 provides a fluid-tight seal between the spacer 28 and a peripheral flange 34 extending outwardly from a tubular extension 36 axially aligned with the hole 24. The extension 36 forms part of a fluid conduit to a first end of a tubular electrolyte storage compartment 38.

An open first end of the extension 36 surrounded by the flange 34 is provided with a fluid-tight seal by a second frangible or rupturable diaphragm 40 peripherally attached to the flange 34 by any suitable means, e.g., welding. The other end of the tubular extension 36 is connected to the tubular storage compartment 38 by a fluid pipeline 42. The flange 34 and the spacer 28 are attached in a concentric layered arrangement to the wall 25 of the container 4 by any suitable means, e.g., bolts 44 passing through the container 4, the spacer 28 and the flange 34 with nuts 46 threaded on the bolts 44 to compress the layered construction. The bolts 44 can be a press fit into respective holes in the wall 25 and can be welded to the wall 25 to maintain the hermiticity of the container 4.

The other or second end of the tubular storage compartment 38 is connected by a fluid pipeline 48 to a pressure generator 50 which may be any suitable device for selectively generating a pressure to be applied to a fluid stored in the tubular storage compartment 38, e.g., an electrically activated pyrotechnic device activated by a voltage applied to a pair of electrical terminals 52 connected to the generator 50. The pressure generator 50 is attached to the pipeline 48 by a suitable interface means at a joint 54 to maintain a fluid-tight condition of the storage compartment 38. The interface means can include a threaded or welded connection (not shown) for the generator 50 and a third rupturable diaphragm 56 to maintain a fluid sealed state of the tubular compartment 38. As shown in the figures, the storage compartment 38 may be arranged to have similar diameter turns and to be concentric with the container 4.

By providing fluid-tight seals at both ends of the tubular storage compartment 38, the fluid in the compartment can be hermetically sealed and stored prior to activation of the cell. The compartment 38 may be made of a material resistant to any corrosive effects of a typical electrolyte, e.g., 316L stainless steel. The related second and third diaphragms 40,56 would be made of the same or similar corrosion resistant material with a thickness substantially less than the wall of the compartment 38 to enable an internal fluid applied pressure to rupture the diaphragms 40,56 before inducing any similar effect on the wall of the compartment 38. The cover 6 and the related first diaphragm 26 would be effective to assure the storage hermeticity of the storage container 4. However, since the container 4 and its related parts are not exposed to the electrolyte during an inactive storage state, they can be made of a material selected for strength and light weight, e.g., aluminum. Thus, the container 4 and its related parts need only provide a short term electrolyte storage during an activated state of the cell. This use of a lightweight material would provide a significant weight reduction in the overall cell structure either with or without the tubular storage compartment 38. The interface spacer 28 can, also, be similarly designed since it does not enter into the long term storage of the electrolyte, e.g., made of an elastoner such as high density polyethylene.

In operation, the electrolyte storage compartment 38 is assembled to a sealed plate container 4 containing the battery stack 2 as shown in the figures prior to the activation of the cell. Since the compartment 38 is interchangeable with any one of the containers 4, they can be manufactured, shipped and stored separately and assembled as needed. An activation of the cell is effected by an energization of the pressure generator 50 by an electrical signal applied to the terminals 52. The resulting gas pressure is applied to the third diaphragm 56 which is designed to rupture at a predetermined pressure, e.g., 200 psi. This pressure is transmitted through the electrolyte in the compartment 38 to rupture the second diaphragm 40 which can be designed to rupture at a similar or lower pressure to assure its sequential operation. The electrolyte is then forced through the second diaphragm 40 into the internal space defined by the interface spacer 28 between the flange 34 and the wall 25 of the container 4 to apply pressure to the first diaphragm 26. The first diaphragm 26 can be designed to rupture at a still lower pressure, e.g., 150 psi, to assure its release of the electrolyte which finally is directed by the spacer 18 into the battery plate stack 2 to energize the cell.

Accordingly, it may be seen that there has been provided, in accordance with the present invention, an improved reserve activated electrochemical cell having an improved cell fluid storage compartment.

The embodiments of the present invention in which an exclusive property or privilege is claimed are defined as follows:

1. A reserve activated electrochemical cell comprising
    a cell reactive fluid storage tubular spiral,
    an electrochemical cell plate container means for storing cell plates and located within the turns of said tubular spiral and adjacent to a first end of said tubular spiral,
    a rupturable means for providing a fluid-tight separation of said spiral and said container means and
    an intermediate spacer means for selectively attaching said first end to said container means while providing a fluid channel including said rupturable means.

2. A cell as set forth in claim 1 wherein the turns of said spiral have a similar diameter and are concentric.

3. A cell as set forth in claim 1 wherein said rupturable means includes a first rupturable diaphragm forming a fluid-tight seal across said first end and a second rupturable diaphragm forming a fluid-tight seal across an opening in said container means.

4. A cell as set forth in claim 3 wherein said first and second diaphragms are axially aligned.

5. A cell as set forth in claim 4 wherein said spacer means includes an annular ring concentric with said first and second diaphragms.

6. A cell as set forth in claim 5 wherein said ring includes O-ring means for forming a fluid-tight seal with said container means and said first end.

7. A cell as set forth in claim 1 and further including selectively actuable pressure generating means attached to a second end of said tubular spiral for selectively applying a pressure to a fluid stored in said spiral to rupture said rupturable means.

8. A cell as set forth in claim 1 wherein said spiral is made of 316L stainless steel and said container means includes a sealed walled container made of aluminum 9. A cell as set forth in claim 1 wherein the plates are battery plates and the fluid is an electrolyte.

10. A cell as set forth in claim 1 wherein said container means includes resilient means for resiliently positioning the cell plates.

* * * * *

UNITED STATES PATENT AND TRADEMARK OFFICE
CERTIFICATE OF CORRECTION

PATENT NO. : 5,068,162
DATED : November 26, 1991
INVENTOR(S) : Kulkarni, et al.

It is certified that error appears in the above-identified patent and that said Letters Patent is hereby corrected as shown below:

Col. 1, after the title "RESERVE ACTIVATED ELECTROCHEMICAL CELL" insert --This invention was made with Government support under Contract No. F33615-87-C-2726 awarded by the Department of the Air Force. The Government has certain rights in this invention.--

Signed and Sealed this

Fifteenth Day of June, 1993

*Attest:*

MICHAEL K. KIRK

*Attesting Officer*  Acting Commissioner of Patents and Trademarks